(12) United States Patent
Humiston et al.

(10) Patent No.: US 10,953,591 B2
(45) Date of Patent: Mar. 23, 2021

(54) EMBOSSED MICROPOROUS MEMBRANE WIPES AND METHODS OF MANUFACTURE AND USE THEREOF

(71) Applicants: Celgard, LLC, Charlotte, NC (US); Ezek Technology, Inc., Taipei (TW)

(72) Inventors: Karl F. Humiston, Fort Mill, SC (US); Kristoffer K. Stokes, Charlotte, NC (US); Victor J. Lin, Washington, NJ (US); Jui-Hung Huang, Taipei (TW)

(73) Assignee: Celgard, LLC, Charlotte, NC (US)

( * ) Notice: Subject to any disclaimer, the term of this patent is extended or adjusted under 35 U.S.C. 154(b) by 0 days.

(21) Appl. No.: 14/662,355

(22) Filed: Mar. 19, 2015

(65) Prior Publication Data

US 2015/0266064 A1    Sep. 24, 2015

Related U.S. Application Data

(60) Provisional application No. 61/955,272, filed on Mar. 19, 2014.

(51) Int. Cl.
*B29C 55/00* (2006.01)
*A45D 34/04* (2006.01)
(Continued)

(52) U.S. Cl.
CPC .............. *B29C 55/00* (2013.01); *A45D 34/04* (2013.01); *A45D 2200/1027* (2013.01);
(Continued)

(58) Field of Classification Search
None
See application file for complete search history.

(56) References Cited

U.S. PATENT DOCUMENTS 3,855,046 A    12/1974    Hansen et al.
4,298,666 A  *  11/1981   Taskier .............. H01M 2/1653
                                                      429/144
(Continued)

FOREIGN PATENT DOCUMENTS

JP    H04-348931 A      12/1992
JP    05-018392 U  *    3/1993
(Continued)

OTHER PUBLICATIONS

English Machine Translation of JP H05-018392 U.*
(Continued)

*Primary Examiner* — Nicole Blan
(74) *Attorney, Agent, or Firm* — Hammer & Associates, P.C.

(57) ABSTRACT

An embossed porous membrane wipe and/or a method of making and/or using such embossed microporous membrane wipe. The preferred embossed microporous membrane wipe includes a microporous membrane embossed alone or with a polypropylene nonwoven. The nonwoven may be a spunbond, meltblown, and/or electrospun nonwoven. The microporous membrane may include a biaxially oriented microporous membrane. The biaxially oriented microporous membrane may be made from one or more block copolymers of polyethylene and/or polypropylene. A method of using such an embossed microporous membrane, composite or laminate wipe for skin oil blotting is also provided.

20 Claims, 1 Drawing Sheet

(51) Int. Cl.
  *B29L 31/00* (2006.01)
  *B29C 55/16* (2006.01)
(52) U.S. Cl.
  CPC ...... *A45D 2200/1063* (2013.01); *B29C 55/16* (2013.01); *B29L 2031/755* (2013.01)

(56) References Cited

U.S. PATENT DOCUMENTS

| | | | |
|---|---|---|---|
| 4,374,888 | A | 2/1983 | Bornslaeger |
| 5,281,413 | A | 1/1994 | Abrutyn et al. |
| 5,620,779 | A | 4/1997 | Levy et al. |
| 5,635,134 | A | 6/1997 | Bourne et al. |
| 5,714,107 | A | 2/1998 | Levy et al. |
| 6,057,061 | A | 5/2000 | Callahan et al. |
| 6,080,507 | A | 6/2000 | Yu |
| 6,602,593 | B1 | 8/2003 | Callahan et al. |
| 6,645,611 | B2 | 11/2003 | Seth |
| 8,795,565 | B2 | 8/2014 | Wei et al. |
| 2002/0155234 | A1* | 10/2002 | Seth ............ A47K 7/00 428/35.2 |
| 2003/0197939 | A1 | 10/2003 | Tsuchimoto et al. |
| 2006/0147503 | A1 | 7/2006 | Floyd |
| 2006/0148915 | A1 | 7/2006 | Floyd et al. |
| 2006/0184915 | A1* | 8/2006 | DeGroote ...... G06F 8/20 717/106 |
| 2007/0196638 | A1 | 8/2007 | Wei et al. |
| 2008/0118827 | A1 | 5/2008 | Call et al. |
| 2010/0279068 | A1 | 11/2010 | Cook et al. |
| 2011/0223486 | A1* | 9/2011 | Zhang ........ B01D 67/0027 429/247 |
| 2014/0302374 | A1 | 10/2014 | Wei et al. |

FOREIGN PATENT DOCUMENTS

| | | |
|---|---|---|
| JP | 2000-063550 A | 2/2000 |
| JP | 2004-528070 A | 9/2004 |
| JP | 2005-139227 A | 6/2005 |
| JP | 2008-527073 A | 7/2008 |
| JP | 2013-527260 A | 6/2013 |
| JP | 2013-180431 A | 9/2013 |
| WO | WO 02/098269 A1 | 12/2002 |
| WO | WO 2011/112885 A1 | 9/2011 |

OTHER PUBLICATIONS

R. Kesting, "Synthetic Polymeric Membranes, A Structural Perspective," 2 ed., John Wiley & Sons (New York, NY), (1985).

Robert E. Kesting, "Stretched Semicrystalline Films," Synthetic Polymeric Membranes A Structural Perspective, 2 ed., John Wiley & Sons (New York), (p. 290-297), (1985).

Robert E. Kesting, "Phase-Inversion Membranes," Synthetic Polymeric Membranes A Structural Perspective, 2 ed., John Wiley & Sons (New York), (p. 237-286), (1985).

* cited by examiner

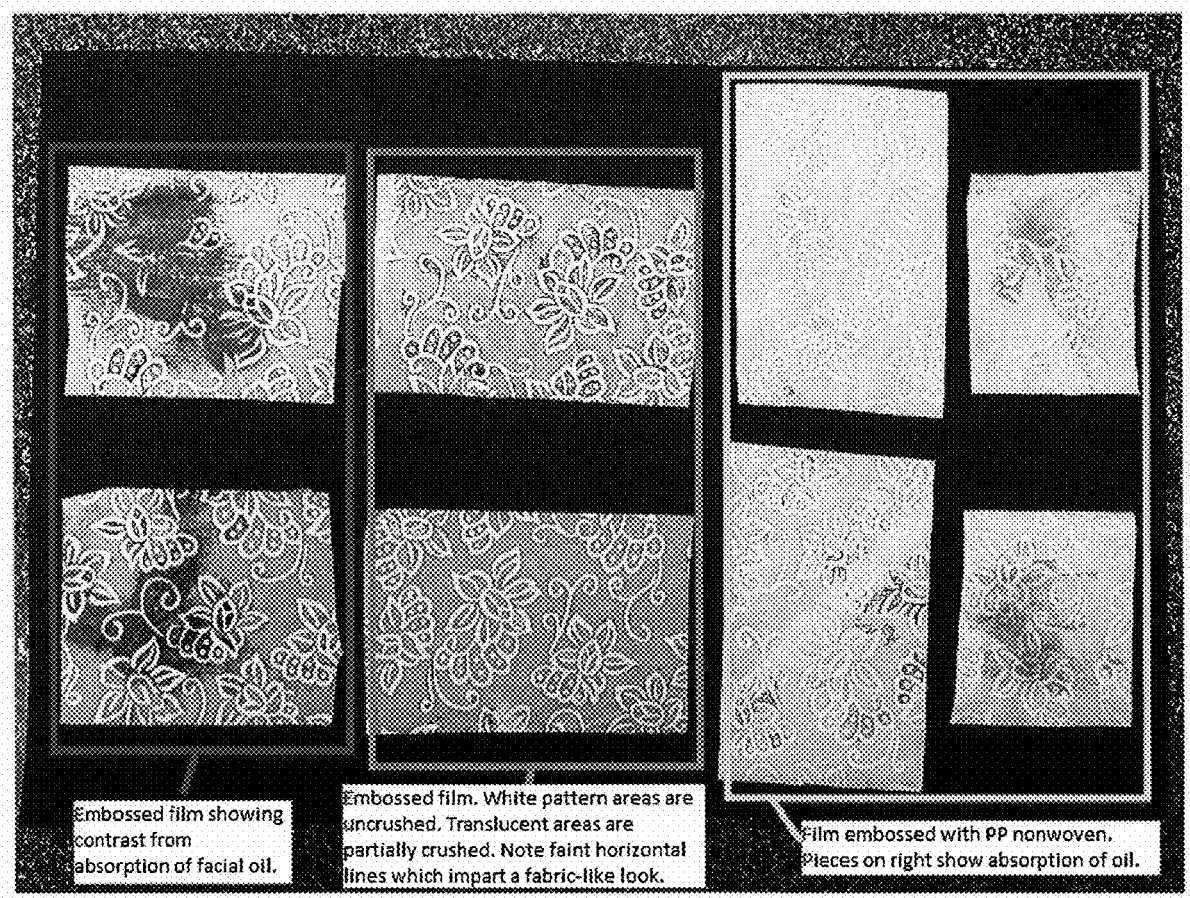

EMBOSSED MICROPOROUS MEMBRANE WIPES AND METHODS OF MANUFACTURE AND USE THEREOF

CROSS REFERENCE TO RELATED APPLICATIONS

This application claims benefit of and priority to U.S. Provisional Application No. 61/955,272 filed Mar. 19, 2014, which is hereby incorporated herein by reference in its entirety.

FIELD OF THE INVENTION

The instant application relates to new or improved porous membrane wipes and methods of manufacture and use thereof, new or improved methods for oil blotting utilizing a new or improved porous membrane wipe, like use in blotting oil from one's skin or face, and/or the removal of fingerprints, smudges and the like from other surfaces such as eyeglasses, electronics, cell phones, displays, optical devices, camera lenses, microscope lenses, and other precision optics, and/or the like. In at least selected embodiments, the new or improved porous membrane wipe may be an embossed or calendered microporous membrane wipe. In at least certain embodiments, the embossed or calendered microporous membrane wipe may be a microporous membrane embossed with a nonwoven, such as a mesh, spunbond, meltblown, or electrospun or other microfiber or nanofiber material. In at least selected embodiments, the embossed microporous membrane wipes may include or comprise a biaxially oriented microporous membrane made from impact copolymers of polyethylene and/or polypropylene. In at least certain embodiments, the embossed microporous membrane wipes may include or comprise a biaxially oriented microporous membrane made from impact copolymers of polyethylene and/or polypropylene embossed with polypropylene and/or polyethylene nonwovens, such as mesh, spunbond, meltblown, or electrospun or other microfiber or nanofiber polypropylene and/or polyethylene nonwovens.

BACKGROUND

Microporous membranes are known, can be made by various processes, and the process by which the membrane is made may have a material impact upon the membrane's physical attributes. See, Kesting, R., Synthetic Polymeric Membranes, A structural perspective, Second Edition, John Wiley & Sons, New York, N.Y., (1985). At least three commercially viable processes for making microporous membranes include: the dry-stretch process (also known as the CELGARD process), the wet process, and the particle stretch process.

The dry-stretch process refers to a process where pore formation results from stretching a nonporous precursor. See, Kesting, Ibid. pages 290-297, incorporated herein by reference. The dry-stretch process is different from the wet process and particle stretch process. Generally, in the wet process, also known as the phase inversion process, or the extraction process or the TIPS process (to name a few), the polymeric raw material is mixed with a processing oil (sometimes referred to as a plasticizer), this mixture is extruded, and pores are then formed when the processing oil is removed (these films may be stretched before or after the removal of the oil). See, Kesting, Ibid. pages 237-286, incorporated herein by reference. Generally, in the particle stretch process, the polymeric raw material is mixed with particulate, this mixture is extruded, and pores are formed during stretching when the interface between the polymer and the particulate fractures due to the stretching forces. See, U.S. Pat. Nos. 6,057,061 and 6,080,507, incorporated herein by reference.

While membranes made by the dry-stretch process have met with excellent commercial success, there is a need to improve their physical attributes, so that they may be used in a wider spectrum of applications.

U.S. Pat. No. 6,602,593 is directed to a microporous membrane, made by a dry-stretch process, where the resulting membrane has a ratio of transverse direction tensile strength to machine direction tensile strength of 0.12 to 1.2. Herein, the TD/MD tensile ratio is obtained by a blow-up ratio of at least 1.5 as the precursor is extruded.

U.S. Patent Publication No. 2007/0196638, incorporated herein in its entirety, discloses a microporous membrane made by a dry-stretch process. The microporous membrane has substantially round shaped pores and a ratio of machine direction tensile strength to transverse direction tensile strength in the range of 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction stretching including a simultaneous controlled machine direction relax.

U.S. Patent Publication No. 2011/0223486, incorporated herein in its entirety, discloses a microporous membrane made by a dry-stretch process that has substantially round shaped pores and a ratio of machine direction tensile strength to transverse direction tensile strength in the range of 0.5 to 6.0. The method of making the foregoing microporous membrane may include the steps of: extruding a polymer into a nonporous precursor, and biaxially stretching the nonporous precursor, the biaxial stretching including a machine direction stretching and a transverse direction stretching, the transverse direction stretching including a simultaneous controlled machine direction relax. At least selected embodiments of such membranes were disclosed to be directed to biaxially oriented porous membranes, composites including biaxially oriented porous membranes, biaxially oriented microporous membranes, biaxially oriented macroporous membranes, filtration media, humidity control media, flat sheet membranes, liquid retention media, and the like, related methods, methods of manufacture, methods of use, and the like.

While membranes made by the dry-stretch process have met with excellent commercial success, such as a variety of CELGARD® dry-stretch porous membranes sold by Celgard, LLC of Charlotte, N.C., it has been found that some such porous membranes may be used in a wider spectrum of applications, may perform better for particular purposes, or the like.

The use of wipes to remove or reduce the accumulation of oil, like skin oil, on the surface of people's skin, especially their faces, along with the surface of other objects (like fingerprints, smudges, and the like, on eyeglasses, electronics, cell phones, displays, optical devices, camera lenses, microscope lenses, and other precision optics, the like, etc.) is known. Oil, smudges, fingerprints, the like, etc. have long been recognized as imparting an undesirable sheen and/or feel. In order to remove the oil, fingerprints and/or smudges, people use various blotting materials or wipes. The principal materials in use today for the skin and face include various types of papers (i.e., cellulose based materials) in addition to microporous polypropylene membranes. Some desired features of these materials include, but are not limited to, the following: pleasant to the touch, both to the fingers and the face; absorbs oil without leaving oily residue on the fingers (microporous polypropylene membrane performs better in this regard than paper); provides visual indication of the absorbed oil; and absorbs oil without smearing or otherwise interfering with facial cosmetics. The most common material used for cleaning or wiping the surface of objects, like eyeglasses, electronics, cell phones, displays, optical devices, camera lenses, microscope lenses and other precision optics, the like, etc. are lint free technical wipes. One example of such a lint free technical wipe is the Kimtech® Touchscreen Wipe® sold by the Kimberly-Clark Corporation. Some desired features of these materials include, but are not limited to, the following: designed for delicate tasks; low lint; non-abrasive; pleasant to the touch; absorbs oil without leaving oily residue on the fingers; provides visual indication of the absorbed oil; and anti-static dispensing.

Facial blotting papers have become increasingly popular in recent years, particularly among young women in East Asian countries such as China, Japan, and Korea. By blotting these disposable sheets on the skin, the undesirable "shine" can be removed. The user may also perceive a benefit of cleaner skin that is less prone to acne. There are two types of facial blotters on the market today—paper and polymeric. Blotters made from paper, similar to tissue used in gift wrapping, absorb oil reasonably well, but tend to be somewhat stiff. Microporous polymeric blotters, which are sold under various brand names including Clean & Clear by Johnson & Johnson, are softer and generally more effective at absorbing oil.

Therefore, there is clearly a need to develop new or improved wipes that provide unique features for certain applications, for certain conditions, or the like.

SUMMARY OF THE INVENTION

In accordance with at least selected embodiments, the instant invention addresses the above mentioned needs, applications, issues or problems and provides a new or improved membrane wipe, composite wipe, and/or related methods. In accordance with at least selected preferred embodiments, the instant invention provides embossed microporous membrane wipes, composites, laminates, and/or related methods. Microporous membranes, like the Celgard® polyolefinic membranes that have been embossed or calendered may be usable as wipes for various applications, including, but not limited to, skin and facial oil blotting wipes, eyeglass wipes, electronic wipes like for cellphones, displays, etc., optical wipes like for optical devices, camera lenses, microscope lenses and other precision optics, or the like, and may be combined or embossed together with polypropylene and/or polyethylene nonwovens, such as mesh, spunbond, meltblown, or electrospun or other microfiber or nanofiber polypropylene and/or polyethylene nonwovens, or the like.

Embossed, as used and described herein, may describe any embossing or calendering type process of the material, including, but not limited to, beetled, watered, embossed, schreiner, the like, combinations thereof, etc. In one embodiment, embossed may be embossing where one or more of the rollers have engraved patterns on them, and the patterns become stamped onto the film or fabric, where the end result is a raised or sunken pattern, depending on the roller.

In one embodiment, a microporous membrane film alone can be calendered and/or embossed. In select embodiments, the microporous membrane film calendered and/or embossed alone to create the instant embossed microporous membrane wipe may be a single ply film. In other select embodiments, the microporous membrane film calendered and/or embossed alone to create the instant embossed microporous membrane wipe may be a bi-layer film. In other select embodiments, the microporous membrane film calendered and/or embossed alone to create the instant embossed microporous membrane wipe may be a multi-ply film.

In another embodiment, the instant embossed microporous membrane wipe may include a microporous membrane film embossed with a nonwoven, including, but not limited to, a spunbond nonwoven material, a meltblown nonwoven material, and/or an electrospun nonwoven material. The nonwoven used in the instant embossed wipe may be made from any desired material. In one embodiment, the nonwoven may be a polypropylene (PP) nonwoven, including, but not limited to, a PP spunbond nonwoven, a PP meltblown nonwoven, or a PP electrospun nonwoven material. The microporous membrane film and the nonwoven can be combined in any manner, including, but not limited to, through adhesive or thermal lamination, and/or the embossing or calendering process of the instant disclosure.

BRIEF DESCRIPTION OF THE DRAWINGS

FIG. 1 includes photographic images of the surface of embossed microporous membrane wipes according to selected embodiments herein.

DETAILED DESCRIPTION

In accordance with at least selected embodiments, the instant invention addresses the above mentioned needs, applications, issues or problems and provides a new or improved membrane wipe, composite wipe, and/or related methods. In accordance with at least selected preferred embodiments, the instant invention provides embossed microporous membrane wipes, composites, laminates, and/or related methods. Microporous membranes, like the Celgard® polyolefinic membranes that have been embossed or calendered may be usable as wipes for various applications, including, but not limited to, skin and facial oil blotting wipes, eyeglass wipes, electronic wipes like for cellphones, displays, etc., optical wipes like for optical devices, camera lenses, microscope lenses and other precision optics, the like, etc., and may be combined or embossed together with polypropylene and/or polyethylene nonwovens, such as mesh, spunbond, meltblown, or electrospun or other microfiber or nanofiber polypropylene and/or polyethylene nonwovens, or the like.

Embossed, as used and described herein, may describe any embossing or calendering type process of the material, including, but not limited to, beetled, watered, embossed, schreiner, the like, combinations thereof, etc. In one embodiment, embossed may be embossing where one or more of the rollers have engraved patterns on them, and the patterns become stamped onto the film or fabric, where the end result is a raised or sunken pattern, depending on the roller (See, for example, the pattern shown in FIG. 1). Embossed may mean having continuous or discontinuous embossing or calendaring.

In one embodiment, a microporous membrane film alone can be calendered and/or embossed. In select embodiments, the microporous membrane film calendered and/or embossed alone to create the instant embossed microporous membrane wipe may be a single ply film. In other select embodiments, the microporous membrane film calendered and/or embossed alone to create the instant embossed microporous membrane wipe may be a bi-layer film. In other select embodiments, the microporous membrane film calendered and/or embossed alone to create the instant embossed microporous membrane wipe may be a multi-ply film.

In another embodiment, the instant embossed microporous membrane wipe may include a microporous membrane film embossed with a nonwoven, including, but not limited to, a spunbond nonwoven material, a meltblown nonwoven material, and/or an electrospun nonwoven material. The nonwoven used in the instant embossed wipe may be made from any desired material. In one embodiment, the nonwoven may be a polypropylene (PP) nonwoven, including, but not limited to, a PP spunbond nonwoven, a PP meltblown nonwoven, and/or a PP electrospun nonwoven material. The microporous membrane film and the nonwoven can be combined in any manner, including, but not limited to, through adhesive or thermal lamination, and/or the embossing or calendering process of the instant disclosure.

Embossed Celgard® microporous membranes, particularly embossed block copolymer Z-Series Celgard membranes, may work exceptionally well as facial blotters. Embossed Celgard facial blotters may be soft and light and may be highly absorbent. Embossed Celgard facial blotters may be provided in both single-layer and double-layer formats. Double-layer Celgard films may absorb much more oil per unit area than single-layer Celgard films. However, single-layer films may give the appearance of higher absorbency because the single-layer films present a sharper contrast between the oiled and non-oiled areas (see, for example, FIG. 1). The oiled area may become transparent due to oil entrapment in the pores, whereas the oil-free area may remain opaque. The greater the contrast, the stronger the impression may be on the user that the film absorbs a lot of oil. A single layer film may absorb oil quickly and may show an oily, clear area, while a double layer film must absorb double the amount of oil to achieve a similar contrast. Reducing the thickness of the single-layer film, such as by embossing or calendering, may further enhance the visual contrast by allowing oil to penetrate more quickly or requiring a smaller amount of oil to make the film transparent (see FIG. 1).

Single-layer facial blotting film, without the benefits described herein, may be flimsy when flat and smooth. When such non-embossed blotting films are stacked and packaged, they may be difficult to separate from one another, and they may not be easy for the user to grab and dab on one's face. The calendering and/or embossing of the microporous membrane, according to the description herein, to create the instant embossed microporous membrane wipe, with or without a nonwoven, may make the wipes firmer and easier to separate, possibly because of the wipe thickness variation resulting from the embossed/calendered pattern, particularly with patterns, may make the wipes firmer and easier to separate because the film thickness variation resulting from the embossed pattern may create air spaces between the layers of wipes. The crushed or calendered portions may be non-porous or less porous than the uncrushed or non-calendered portions.

In addition to the advantages in visual contrast and handling, the embossing pattern may create a striking visual effect which may impart a highly elegant look to the wipe. See, for example, the floral pattern shown in FIG. 1. In one embodiment, the embossing roll may be designed with tightly spaced, parallel lines or other textured pattern which may further contribute to the film's silky appearance.

The embossing and/or calendering process may involve a partial crush of the membrane in the non-pattern area (or vice versa). The pattern area, which may be left by the negative pattern impression on the embossing roll, may retain its original thickness as well as its characteristic milky white color (the white color results from the scattering of light within the pores of the film). For example, and not limited thereto, the partially crushed areas can be crushed from their original thickness of about 19 μm to a final thickness of about 13 μm. The combination of reduced thickness and tightly spaced, parallel lines or other textured pattern in the partially crushed area may result in a translucency that provides a striking contrast to the bright white un-crushed pattern lines.

In addition, the instant embossed microporous membrane wipes may provide a substantial increase in tensile strength compared to unembossed wipes. Table 1 below shows test results for some of the embossed wipes, with comparison to unembossed comparative samples.

TABLE 1

| Test | Unembossed EZ3030 (sample 1) | Unembossed EZ3030 (sample 2) | Embossed EZ3030 | Change vs. sample 1 | Change vs. sample 2 |
|---|---|---|---|---|---|
| Thickness (μm) | about 19 | 19.9 | 13.1 | −30% | −34% |
| Puncture strength (g) | 124 | 122 | 166 | +35% | +36% |
| MD Tensile (kgf/cm$^2$) | 560 | 378 | 846 | +51% | +124% |
| TD Tensile (kgf/cm$^2$) | 277 | 234 | 369 | +33% | +58% |

In sum, the advantages of the embossed microporous membrane wipes of the instant invention may be numerous, including, but not limited to: creation of a pattern in the wipe through embossing which involves partial crushing of the membrane in the non-pattern area; enhancement, through the translucency which results from partial crushing of the membrane, of visual contrast from absorbed skin oil; improvement of the tactile feel (i.e., hand) of the membrane through the embossing process, particularly the partial crushing of most of the membrane and the imparting of faint, thin, parallel lines or other textured pattern in the translucent areas; creation of a striking visual effect in the membrane through the contrast between the white pattern areas and the translucent partially crushed areas; further enhancement of this striking visual effect through the creation of faint, thin, parallel lines or other textured pattern in the translucent areas which give a feel and appearance of delicate fabric; the increase in the wipe's tensile strength through partial crushing (the improvement is seen in both the machine direction and transverse direction tensile strength and in puncture strength); the like; and combinations thereof.

In one embodiment, the embossed microporous membrane wipes of the instant invention may be used for blotting skin oils, such as oils from the skin or face. Some desired features of the embossed microporous membrane wipes of the instant invention being used as oil blotting wipes may include, but are not limited to: pleasant to the touch, both to the fingers and the face; absorbs oil without leaving oily residue on the fingers; provides visual indication of the absorbed oil; and absorbs oil without smearing or otherwise interfering with facial cosmetics. Particularly in regard to the second, third, and fourth performance measures listed above, the embossed microporous membrane wipes of the instant invention have been found to perform as well or better than commercially available skin blotters, such as Clean & Clear by Johnson & Johnson and private label products from retail chains such as CVS, Walgreens, and Target, which are made from microporous polypropylene membrane that contain mineral oil. The excellent performance of the instant disclosure of embossed microporous membrane wipes as skin oil blotters may result from their inherent oleophilicity and high porosity. In addition, the embossed microporous membrane wipes of the instant disclosure may be oil-free, whereas the microporous polypropylene membranes sold under the Clean & Clear brand and other private label brands contain mineral oil.

In another embodiment, the embossed microporous membrane wipes of the instant invention may be used for cleaning surfaces of oil, fingerprints, smudges, etc., including, but not limited to, eyeglasses, electronics, cell phones, displays, optical devices, camera lenses, microscope lenses, and other precision optics, the like, etc. Some desired features of the embossed microporous membrane wipes of the instant invention being used as surface cleaners may include, but are not limited to, the following: designed for delicate tasks; low lint; non-abrasive; pleasant to the touch; absorbs oil without leaving oily residue on the fingers; provides visual indication of the absorbed oil; and anti-static dispensing. The embossed microporous membrane wipes of the instant disclosure have been found to work extremely well as a lint free technical wipe for optics and other technical needs. Fingerprints, smudges, and the like on display screens, eyeglasses, and similar surfaces are largely oil-based. Consequently, the instant embossed microporous membrane wipes may work particularly well as wipes for these surfaces because of their oil absorption properties. The embossed microporous membrane wipes may also have the additional benefits of being very soft to the touch and having very high porosity, thus enhancing the absorptive properties of such wipes. Similar to the applications that lint free technical Kimtech® Touchscreen Wipe® wipes are typically used for, the instant embossed microporous membrane wipes, and particularly embossed biaxially stretched impact copolymer membrane wipes, oil-free wipes, could find wide use as clean room wipes, wipes for high precision optics, or even in consumer products as disposable eyeglass wipes in lieu of microfiber cleaning cloths.

In one embodiment, the embossed microporous membrane wipes of the instant invention could include biaxially-oriented Celgard® membranes, such as those disclosed in U.S. Patent Publication Nos. 2007/0196638 and 2011/0223486. Such biaxially-oriented membranes may be preferred as they may perform even better as skin oil blotters than uniaxially-oriented Celgard membranes because biaxial orientation increases the membranes' porosity. Moreover, biaxially-oriented Celgard membranes made from block copolymers of polyethylene and polypropylene have the additional advantage of exceptionally pleasant touch, relative both to Celgard membranes made from pure polypropylene and to commercially available skin oil blotters made from microporous polypropylene membrane. However, the invention is not so limited to the preferred biaxially-oriented embossed microporous membrane wipes, and uniaxially-oriented or other biaxially-oriented embossed microporous membrane wipes may also be used in the embossed microporous membrane wipes of the instant invention. For example without limitation, other dry process, wet process, beta nucleated biaxially oriented polypropylene (BNBOPP) process, or particle stretch (single or multi ply or layer) porous membranes, laminates or composites may be used.

In one embodiment, the embossed microporous membrane wipe may include a membrane made by a dry-stretch process and have substantially round shaped pores and a ratio of machine direction tensile strength to transverse direction tensile strength in the range of 0.5 to 4.0. The embossed microporous membrane wipe may include a thin, pliable, polymeric sheet, foil, or film having a plurality of pores therethrough.

Regarding the pore shape, the pores of the microporous membrane used in the embossed wipes may be characterized as substantially round shaped. Further, the pore shape of the membrane may be characterized by an aspect ratio, the ratio of the length to the width of the pore. In one embodiment of the microporous membrane used in the instant embossed wipes, the aspect ratio ranges from 0.75 to 1.25.

Regarding the ratio of machine direction tensile strength to transverse direction tensile strength, in one embodiment, this ratio is between 0.5 and 5.0.

The microporous membrane used in at least selected embodiments of the instant embossed microporous membrane wipes may be further characterized as follows: an average pore size in the range of 0.03 to 0.50 microns (μm); a porosity in the range of 20-80%; and/or a transverse direction tensile strength of greater than 175 Kg/cm$^2$. The foregoing values are exemplary values and are not intended to be limiting, and accordingly should be viewed as merely representative of the microporous membrane used in the instant embossed microporous membrane wipes.

The polymers used in the microporous membrane of the instant embossed microporous membrane wipes may be characterized as thermoplastic polymers. These polymers may be further characterized as semi-crystalline polymers. In one embodiment, semi-crystalline polymer may be a polymer having a crystallinity in the range of 20 to 80%. Such polymers may be selected from the following group: polyolefins, fluorocarbons, polyamides, polyesters, polyacetals (or polyoxymethylenes), polysulfides, polyvinyl alcohols, co-polymers thereof, and combinations thereof. Polyolefins may include polyethylenes (LDPE, LLDPE, HDPE, UHMWPE), polypropylene (PP), polybutene, polymethylpentene, co-polymers thereof, and blends thereof. Fluorocarbons may include polytetrafluoroethylene (PTFE), polychlorotrifluoroethylene (PCTFE), fluorinated ethylene propylene (FEP), ethylene chlorotrifluoroethylene (ECTFE), ethylene tetrafluoroethylene (ETFE), polyvinylidene fluoride (PVDF), polyvinylfluoride (PVF), perfluoroalkoxy (PFA) resin, co-polymers thereof, and blends thereof. Polyamides may include, but are not limited to: polyamide 6, polyamide 6/6, Nylon 10/10, polyphthalamide (PPA), co-polymers thereof, and blends thereof. Polyesters may include polyester terephthalate (PET), polybutylene terephthalate (PBT), poly-1-4-cyclohexylenedimethylene terephthalate (PCT), polyethylene naphthalate (PEN), and liquid crystal polymers (LCP). Polysulfides include, but are not limited to, polyphenylsulfide, polyethylene sulfide, co-polymers thereof, and blends thereof. Polyvinyl alcohols include, but are not limited to, ethylene-vinyl alcohol, co-polymers thereof, and blends thereof.

In a possibly preferred embodiment, the polymers used in the microporous membrane of the instant embossed microporous membrane wipes may be impact copolymers (polypropylene (PP) with ethylene-propylene (EPR)).

In other select embodiments, the microporous membrane used in the instant embossed wipe may include other ingredients. For example, those ingredients may include: fillers (inert particulates used to reduce the cost of the wipe, but otherwise having no significant impact on the manufacture of the wipe or its physical properties), anti-static agents, anti-blocking agents, anti-oxidants, lubricants (to facilitate manufacture), and the like.

In other various embodiments of the microporous membrane used in the instant embossed wipes, various materials may be added to the polymers to modify or enhance the properties of the wipe. Such materials include, but are not limited to: (1) polyolefins or polyolefin oligomers with a melting temperature less than 130° C.; (2) Mineral fillers, including, but not limited to: calcium carbonate, zinc oxide, diatomaceous earth, talc, kaolin, synthetic silica, mica, clay, boron nitride, silicon dioxide, titanium dioxide, barium sulfate, aluminum hydroxide, magnesium hydroxide and the like, and blends thereof; (3) Elastomers, including, but not limited to: ethylene-propylene (EPR), ethylene-propylene-diene (EPDM), styrene-butadiene (SBR), styrene isoprene (SIR), ethylidene norbornene (ENB), epoxy, and polyurethane and blends thereof; (4) Wetting agents, including, but not limited to, ethoxylated alcohols, primary polymeric carboxylic acids, glycols (e.g., polypropylene glycol and polyethylene glycols), functionalized polyolefins etc.; (5) Lubricants, for example, silicone, fluoropolymers, Kemamide®, oleamide, stearamide, erucamide, calcium stearate, or other metallic stearate; (6) flame retardants, for example, brominated flame retardants, ammonium phosphate, ammonium hydroxide, alumina trihydrate, and phosphate ester; (7) cross-linking or coupling agents; (8) polymer processing aids; and/or (9) any type of nucleating agents including beta-nucleating agent for polypropylene.

The microporous membrane of the instant embossed microporous membrane wipes may be a single ply or multi-ply membrane. Regarding the multi-ply embodiments, the membrane may be one ply of the multi-ply membrane or the instant membrane may be all of the plies of the multi-ply membrane. If the membrane is less than all of the plies of the multi-ply membrane, the multi-ply membrane may be made via a lamination process. If the membrane is all plies of the multi-ply membrane, the multi-ply membrane may be made via a lamination process or an extrusion process. Further, multi-ply membranes may be made of plies of the same materials or of differing materials.

In select possibly preferred embodiments, the microporous membrane used in the instant embossed microporous membrane wipe may be made by a dry-stretch process where the precursor membrane is biaxially stretched (i.e., not only stretched in the machine direction, but also in the transverse machine direction). This process is discussed in great detail in U.S. Patent Publication Nos. 2007/0196638 and 2011/0223486, which are incorporated herein by reference, and discussed further below.

In general, the process for making the foregoing microporous membrane may include the steps of extruding a nonporous precursor, and then biaxially stretching the nonporous precursor. Optionally, the nonporous precursor may be annealed prior to stretching. In one embodiment, the biaxial stretching includes a machine direction stretch and a transverse direction stretch with a simultaneous controlled machine direction relax. The machine direction stretch and the transverse direction stretch may be simultaneous or sequential. In one embodiment, the machine direction stretch is followed by the transverse direction stretch with the simultaneous machine direction relax. This process is discussed in greater detail below.

Extrusion may be generally conventional (conventional refers to conventional for a dry-stretch process). The extruder may have a slot die (for flat precursor) or an annular die (for parison precursor). In the case of the latter, an inflated parison technique may be employed (e.g., a blow up ratio (BUR)). However, the birefringence of the nonporous precursor may not have to be as high as in the conventional dry-stretch process. For example, in the conventional dry-stretch process to produce a membrane for the embossed wipe with a >35% porosity from a polypropylene resin, the birefringence of the precursor may be >0.0130; while with the instant process, the birefringence of the PP precursor may be as low as 0.0100. In another example, a membrane for the embossed wipe with a >35% porosity from a polyethylene resin, the birefringence of the precursor may be >0.0280; while with the instant process, the birefringence of the PE precursor may be as low as 0.0240.

Annealing (optional) may be carried out, in one embodiment, at temperatures between $T_m$–80° C. and $T_m$–10° C. (where $T_m$ is the melt temperature of the polymer); and in another embodiment, at temperatures between $T_m$–50° C. and $T_m$–15° C. Some materials, e.g., those with high crystallinity after extrusion, such as polybutene, may require no annealing.

Machine direction stretch may be conducted as a cold stretch or a hot stretch or both, and as a single step or multiple steps. In one embodiment, cold stretching may be carried out at <$T_m$–50° C., and in another embodiment, at <$T_m$–80° C. In one embodiment, hot stretching may be carried out at <$T_m$–10° C. In one embodiment, total machine direction stretching may be in the range of 50-500%, and in another embodiment, in the range of 100-300%. During machine direction stretch, the precursor may shrink in the transverse direction (conventional).

Transverse direction stretching may include a simultaneous controlled machine direction relax. This means that as the precursor is stretched in the transverse direction the precursor is simultaneously allowed to contract (i.e., relax), in a controlled manner, in the machine direction. The transverse direction stretching may be conducted as a cold step, or a hot step, or a combination of both. In one embodiment, total transverse direction stretching may be in the range of 100-1200%, and in another embodiment, in the range of 200-900%. In one embodiment, the controlled machine direction relax may range from 5-80%, and in another embodiment, in the range of 15-65%. In one embodiment, transverse stretching may be carried out in multiple steps. During transverse direction stretching, the precursor may or may not be allowed to shrink in the machine direction. In an embodiment of a multi-step transverse direction stretching, the first transverse direction step may include a transverse stretch with the controlled machine relax, followed by simultaneous transverse and machine direction stretching, and followed by transverse direction relax and no machine direction stretch or relax.

Optionally, the precursor, after machine direction and transverse direction stretching may be subjected to a heat setting, as is well known.

The foregoing microporous membrane for use in the embossed microporous membrane wipe and process are further illustrated in the following non-limiting examples.

EXAMPLES

The test values reported herein, thickness, porosity, tensile strength, and aspect ratio, were determined as follows: thickness—ASTM-D374 using the Emveco Microgage 210-A micrometer; porosity—ASTM D-2873; tensile strength—ASTM D-882 using an Instron Model 4201; and aspect ratio measurements taken from SEM micrographs.

The following examples were produced by conventional dry-stretched techniques, except as noted.

Example 1

Polypropylene (PP) resin is extruded using a 2.5 inch extruder. The extruder melt temperature is 221° C. Polymer melt is fed to a circular die. The die temperature is set at 220° C., polymer melt is cooled by blowing air. Extruded precursor has a thickness of 27 μm and a birefringence of 0.0120. The extruded film was then annealed at 150° C. for 2 minutes. The annealed film is then cold stretched to 20% at room temperature, and then hot stretched to 228% and relaxed to 32% at 140° C. The machine direction (MD) stretched film has a thickness of 16.4 micron (μm), and porosity of 25%. The MD stretched film is then transverse direction (TD) stretched 300% at 140° C. with MD relax of 50%. The finished film has a thickness of 14.1 microns, and porosity of 37%. TD tensile strength of finished film is 550 Kg/cm$^2$.

Example 2

Polypropylene (PP) resin is extruded using a 2.5 inch extruder. The extruder melt temperature is 220° C. Polymer melt is fed to a circular die. The die temperature is set at 200° C., polymer melt is cooled by blowing air. Extruded precursor has a thickness of 9.5 μm and a birefringence of 0.0160. HDPE resin is extruded using a 2.5 inch extruder. The extruder melt temperature is 210° C. Polymer melt is fed to a circular die. Die temperature is set at 205° C., polymer melt is cooled by air. Extruded precursor has a thickness of 9.5 μm and a birefringence of 0.0330. Two PP layers and one PE layers are laminated together to form a PP/PE/PP tri-layer film. Lamination roll temperature is 150° C. Laminated tri-layer film is then annealed at 125° C. for 2 minutes. The annealed film is then cold stretched to 20% at room temperature, and then hot stretched to 160% and relaxed to 35% at 113° C. The MD stretched film has a thickness of 25.4 micron, and porosity of 39%. The MD stretched film is then TD stretched 400% at 115° C. with MD relax of 30%. The finished film has a thickness of 19.4 microns and porosity of 63%. TD tensile strength of finished film is 350 Kg/cm$^2$.

Example 3

PP resin and HDPE resin are extruded using a co-extrusion die to form a PP/PE/PP tri-layer film. Extruder melt temperature for PP is 243° C., and extruder melt temperature for PE is 214° C. Polymer melt is then fed to a co-extrusion die which is set at 198° C. Polymer melt is cooled by blowing air. The extruded film has a thickness of 35.6 microns. The extruded precursor is then annealed at 125° C. for 2 minutes. The annealed film is then cold stretched to 45% at room temperature and hot stretched to 247% and relaxed to 42% at 113° C. The MD stretched film has a thickness of 21.5 microns and porosity of 29%. The MD stretched film is then TD stretched 450% at 115° C. with 50% MD relax. The finished film has a thickness of 16.3 microns and porosity of 59%. TD tensile strength of finished film is 570 Kg/cm$^2$.

Example 4

PP resin and HDPE resin are co-extruded and MD stretched the same way as in Example 3. The MD stretched film is then TD stretched 800% at 115° C. with 65% MD relax. The finished film has a thickness of 17.2 microns and porosity of 49%. TD tensile strength of finished film is 730 Kg/cm$^2$.

Example 5

PP resin and PE resin are extruded using a co-extrusion die. Extruder melt temperature for PP is 230° C., and extruder melt for PE is 206° C. Polymer melt is then fed to a co-extrusion die which is set at 210° C. Polymer melt is then cooled by blowing air. The extruded film has a thickness of 36.0 microns. The extruded precursor is then annealed at 105° C. for 2 minutes. The annealed film is then cold stretched to 20%, and then hot stretched at 105° C. to 155% and then relaxed to 35%. The MD stretched film is then TD stretched 140% at 110° C. with 20% MD relax. The finished film has a thickness of 14.8 microns and porosity of 42%. TD tensile strength of finished film is 286 Kg/cm$^2$.

Example 6

PP resin and PE resin are extruded using a co-extrusion die to form a PP/PE/PP trilayer film. Extruder melt temperature for PP is 245° C., and extruder melt temperature for PE is 230° C. Polymer melt is then fed to a co-extrusion die which is set at 225° C. Polymer melt is cooled by blowing air. The extruded film has a thickness of 27 microns and a birefringence of 0.0120. The extruded precursor is then annealed at 115° C. for 2 minutes. The annealed film is then cold stretched to 22% at room temperature and hot stretched to 254% and relaxed to 25% at 120° C. (total machine direction stretch=251%). The MD stretched film has a thickness of 15 microns and porosity of 16%. The MD stretched film is then TD stretched 260% at 130° C. with 50% MD relax, followed by a simultaneous MD and TD stretch of 50% and 216% in each direction at 130° C., and finally the film is held fast in the MD (100%) and allowed to relax 57.6% in the TD at a temperature of 130° C. The finished film has a thickness of 7.6 microns and porosity of 52%. TD tensile strength of finished film is 513 Kg/cm$^2$.

Example 7

PP resin and PE resin are extruded using a co-extrusion die to form a PP/PE/PP trilayer film. Extruder melt temperature for PP is 222° C., and extruder melt temperature for PE is 225° C. Polymer melt is then fed to a co-extrusion die which is set at 215° C. Polymer melt is cooled by blowing air. The extruded film has a thickness of 40 microns and birefringence of 0.0110. The extruded precursor is then annealed at 105° C. for 2 minutes. The annealed film is then cold stretched to 36% at room temperature and hot stretched to 264% and relaxed to 29% at 109° C. (total machine direction stretch=271%). The MD stretched film has a thickness of 23.8 microns and porosity of 29.6%. The MD stretched film is then TD stretched 1034% at 110° C. with 75% MD relax. The finished film has a thickness of 16.8 microns and porosity of 46%. TD tensile strength of finished film is 1037 Kg/cm$^2$.

Example 8

A PP based impact copolymer is extruded to form a film. Extruder melt temperature is 249° C. Polymer melt is fed to an extrusion die set at 215° C. The polymer melt is cooled by blowing air. The extruded film has a thickness of 34 μm and birefringence of 0.0116. The extruded precursor is then annealed at 154° C. for 2 minutes. The annealed film is then cold stretched to 30% at room temperature and hot stretched 190% and relaxed 61% at 140° C. (total machine direction stretch=159%). The MD stretched film has a thickness of 26 μm and porosity of 40%. The MD stretched film is then TD stretched 260% at 150° C. with 50% MD relax, followed by a simultaneous MD and TD stretch of 50% and 216%, respectively, at 150° C.

In the following table, Table 2, the results of the foregoing experiments are summarized and compared to two commercially available dry-stretched films: A) CELGARD® 2400 (single ply polypropylene); and B) CELGARD® 2325 (trilayer polypropylene/polyethylene/polypropylene).

TABLE 2

|  | TD stretching | Thickness (um) | Porosity | TD Tensile strength (kg/cm$^2$) | MD Tensile strength (kg/cm$^2$) | MD/TD tensile ratio |
| --- | --- | --- | --- | --- | --- | --- |
| A | N/A | 25.4 | 37% | 160 | 1700 | 10.6 |
| B | N/A | 25.1 | 40% | 146 | 1925 | 13.2 |
| Ex 1 | 300% | 14.1 | 37% | 550 | 1013 | 1.8 |
| Ex 2 | 400% | 19.4 | 63% | 350 | 627 | 1.8 |
| Ex 3 | 450% | 16.3 | 59% | 570 | 754 | 1.3 |
| Ex 4 | 800% | 17.2 | 49% | 730 | 646 | 0.9 |
| Ex 5 | 140% | 14.8 | 42% | 286 | 1080 | 3.8 |
| Ex 6 | 418% | 7.6 | 52% | 513 | 1437 | 2.8 |
| Ex 7 | 1034% | 16.8 | 46% | 1037 | 618 | 0.6 |
| Ex 8 | 450% | 17 | 73% | 287 | 558 | 1.9 |

In at least selected embodiments, aspects or objects, the embossed porous membrane wipes may be a microporous membrane embossed with or without a nonwoven, such as a mesh, spunbond, meltblown, or electrospun or other microfiber or nanofiber material. In at least select other embodiments, the embossed microporous membrane wipes may be a biaxially oriented microporous membrane made from impact copolymers of polyethylene and/or polypropylene. In at least select other embodiments, the embossed microporous membrane wipes may be a biaxially oriented microporous membrane made from impact copolymers of polyethylene and/or polypropylene embossed with polypropylene or polyethylene nonwovens, such as spunbond, meltblown, or electrospun or other microfiber or nanofiber polypropylene or polyethylene nonwovens.

In another embodiment, the instant embossed microporous membrane wipe may include a microporous membrane film embossed with a nonwoven, including, but not limited to, a spunbond nonwoven material, a meltblown nonwoven material, or an electrospun nonwoven material. The nonwoven used in the instant embossed wipe may be made from any desired material. In one embodiment, the nonwoven may be a polypropylene (PP) nonwoven, including, but not limited to, a PP spunbond nonwoven, a PP meltblown nonwoven, or a PP electrospun nonwoven material. The microporous membrane film and the nonwoven can be combined in any manner, including, but not limited to, through adhesive or thermal lamination, and/or the embossing or calendering process of the instant disclosure.

In accordance with at least selected embodiments, aspects or objects, there is provided an embossed microporous membrane wipe and/or a method of using such embossed microporous membrane wipe. The embossed microporous membrane wipe may include a microporous membrane embossed alone or with a polypropylene nonwoven, where such a nonwoven may be a mesh, spunbond, meltblown, and/or electrospun nonwoven. The microporous membrane may be a biaxially oriented microporous membrane. The biaxially oriented microporous membrane may be made from block copolymers of polyethylene and/or polypropylene. A method of making (form the embossed precursor, cut it into individual wipes, package the wipes) and/or using such an embossed microporous membrane wipe for skin oil blotting is also contemplated.

In at least selected embodiments, aspects or objects, there are provided new or improved porous membrane wipes and methods of manufacture and use thereof, new or improved methods for oil blotting utilizing a new or improved porous membrane wipe, like use in blotting oil from one's skin or face, and/or the removal of fingerprint, smudges and the like from other surfaces like eyeglasses, electronics, cell phones, displays, optical devices, camera lenses, microscope lenses and other precision optics, and/or the like. In at least selected embodiments, the new or improved porous membrane wipes may be an embossed or calendered microporous membrane wipe. In at least certain embodiments, the embossed microporous membrane wipes may be a microporous membrane embossed with a nonwoven, such as a mesh, spunbond, meltblown, or electrospun or other microfiber or nanofiber material. In at least selected embodiments, the embossed microporous membrane wipes may be pieces or portions of a biaxially oriented microporous membrane made from impact copolymers of polyethylene and/or polypropylene. In at least certain embodiments, the embossed microporous membrane wipes may be pieces or portions of a biaxially oriented microporous membrane made from impact copolymers of polyethylene and/or polypropylene embossed with polypropylene or polyethylene nonwovens, such as mesh, spunbond, meltblown, or electrospun or other microfiber or nanofiber polypropylene or polyethylene nonwovens.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

The invention claimed is:

1. An embossed microporous membrane wipe comprising:
    a membrane with an average pore size of about 0.50 microns, a porosity in a range of 20-80%, or a transverse direction tensile strength of ≥175 kgf/cm$^2$;
    the membrane is made of a polymer selected from the group consisting of polyolefins, polyamides, polyesters, polyacetals, polysulfides, polyvinyl alcohols, co-polymers thereof, and combinations thereof and a dry-stretch process; and
    the membrane has substantially round shaped pores, and a ratio of machine direction tensile strength to transverse direction tensile strength in a range of 0.5 to 5.0, and an embossed section, wherein the embossed section has a thickness of about 13 microns and an un-embossed section has a thickness of from 19 to 20 microns.

2. The embossed microporous membrane wipe of claim 1, being adapted for skin oil blotting, and/or for removal of fingerprint or smudges from surfaces.

3. The embossed microporous membrane wipe of claim 1, wherein the microporous membrane wipe is at least one of: a single ply film, a bi-layer film, or a multi-ply film.

4. The embossed microporous membrane wipe of claim 1 having characteristics comprising a puncture strength of 166 g; a MD Tensile strength of 846 kgf/cm$^2$; and a TD Tensile strength of 369 kgf/cm$^2$.

5. The embossed microporous membrane wipe of claim 1 including a pattern in the wipe through embossing.

6. The embossed microporous membrane wipe of claim 1 wherein the embossed section is continuous or discontinuous.

7. The embossed microporous membrane wipe of claim 1 wherein the membrane is at least one of:
 a single or multilayer membrane, a composite or laminate, the polymer being a semi-crystalline polymer, or
 said substantially round shaped pores having an aspect ratio in a range of 0.75 to 1.25.

8. The embossed microporous membrane wipe according to claim 7, with said membrane further having at least one of:
 a transverse direction tensile strength of at least about 225 kgf/cm$^2$,
 a transverse direction shrinkage of:
 less than about 6.0% at 90° C.;
 less than about 15.0% at 120° C.

9. The embossed microporous membrane wipe of claim 7, wherein said membrane is at least one of a blown film, a slot die film, a single layer precursor formed by at least one of single layer extrusion and multilayer extrusion, or a multilayer precursor formed by at least one of coextrusion and lamination.

10. The embossed microporous membrane wipe of claim 1 wherein the dry-stretch process including the steps of:
 extruding the polymer into at least a single layer nonporous precursor, and
 biaxially stretching the nonporous precursor to make it microporous, the biaxial stretching including a machine direction stretching and a transverse direction stretching, the transverse direction stretching including a simultaneous controlled machine direction relax.

11. The embossed microporous membrane wipe of claim 1 wherein said membrane has substantially round shaped pores, a JIS Gurley of less than about 100, and a hydro-head pressure greater than about 140 psi.

12. The embossed microporous membrane wipe of claim 11 wherein a ratio of machine direction tensile strength to transverse direction tensile strength in the range of about 1.0 to 5.0, and the JIS Gurley of less than about 60.

13. The embossed microporous membrane wipe of claim 1, further comprising a nonwoven laminated to said membrane, the nonwoven is selected from the group consisting of: a meltblown nonwoven material, and an electrospun nonwoven material.

14. The embossed microporous membrane wipe according to claim 13, wherein the nonwoven is a polypropylene (PP) nonwoven.

15. The embossed microporous membrane wipe according to claim 13, wherein laminating is adhesive or thermal lamination, embossing, calendering, or combinations thereof.

16. A method of blotting oil from one's skin or face comprising the steps of:
 providing an embossed microporous membrane wipe of claim 1; and
 blotting oil from one's skin or face using said embossed microporous membrane wipe.

17. A method of cleaning a surface comprising the steps of:
 providing an embossed microporous membrane wipe of claim 1; and
 wiping said surface with said embossed microporous membrane wipe.

18. The method of claim 17 wherein said surface being selected from the group consisting of: eyeglasses; electronics; cell phones; displays; optical devices; camera lenses; microscope lenses; optics; and combinations thereof.

19. A method of making an embossed microporous membrane wipe, an embossed microporous membrane wipe for skin oil blotting, or an embossed microporous membrane wipe for removal of fingerprint and/or smudges from surfaces comprising the steps of:
 extruding, via a dry-stretch process, a polymer into a nonporous precursor, the precursor consisting of a polymer selected from the group consisting of polyolefins, polyamides, polyesters, polyacetals, polysulfides, polyvinyl alcohols, co-polymers thereof, and combinations thereof,
 biaxially stretching the nonporous precursor to form a biaxially stretched membrane, the biaxial stretching including a machine direction stretching and a transverse direction stretching, the transverse direction stretching including a simultaneous controlled machine direction relax; and
 embossing the biaxially stretched membrane, the membrane having an embossed section and a thickness of the embossed section of about 13 microns and of an un-embossed section of from 19 to 20 microns, an average pore size of about 0.50 microns, a porosity in a range of 20-80%, or a transverse direction tensile strength of ≥175 kgf/cm$^2$; and
 laminating a nonwoven to said membrane, wherein the nonwoven is selected from the group consisting of: a meltblown nonwoven material, and an electrospun nonwoven material.

20. The method according to claim 19 wherein at least one of:
 (1) wherein the polymer excludes any oils for subsequent removal to form pores or any pore-forming materials to facilitate pore formation,
 (2) wherein the polymer being a semi-crystalline polymer,
 (3) wherein the method comprises: annealing the nonporous precursor after extruding and before biaxially stretching, wherein annealing being conducted at a temperature in the range of $T_m$–80° C. to $T_m$–10° C.,
 (4) wherein the biaxially stretching comprises: machine direction stretching, and thereafter transverse direction stretching including a simultaneous machine direction relax,
 (5) wherein machine direction stretching being conducted either hot or cold or both,
 (6) wherein cold machine direction stretching being conducted at a temperature <$T_m$–50° C. and/or hot machine direction stretching being conducted at a temperature <$T_m$–10° C.,
 (7) wherein the total machine direction stretch being in the range of 50-500%, the total transverse direction stretch being in the range of 100-1200%, the machine direction relax from the transverse direction stretch being in the range of 5-80%, or combinations thereof, and
 (8) wherein the method comprises providing a nonwoven on one side of said biaxially stretched membrane.

* * * * *